US012189761B2

(12) United States Patent
Chung et al.

(10) Patent No.: US 12,189,761 B2
(45) Date of Patent: Jan. 7, 2025

(54) METHOD AND SYSTEM FOR DETECTING HOOKING USING CLUSTERING API INFORMATION

(71) Applicant: LINE Plus Corporation, Seongnam-si (KR)

(72) Inventors: Sang Min Chung, Seongnam-si (KR); Joontae Choi, Seongnam-si (KR); SangHun Jeon, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 228 days.

(21) Appl. No.: 17/329,663

(22) Filed: May 25, 2021

(65) Prior Publication Data

US 2021/0374231 A1    Dec. 2, 2021

(30) Foreign Application Priority Data

May 26, 2020    (KR) .................. 10-2020-0062769

(51) Int. Cl.
*G06F 21/55*    (2013.01)
*G06F 21/14*    (2013.01)
*G06F 21/52*    (2013.01)
*G06F 21/56*    (2013.01)
*H04L 67/133*    (2022.01)

(52) U.S. Cl.
CPC ............ *G06F 21/554* (2013.01); *G06F 21/14* (2013.01); *G06F 21/52* (2013.01); *G06F 21/566* (2013.01); *H04L 67/133* (2022.05)

(58) Field of Classification Search
CPC ........ G06F 21/554; G06F 21/14; G06F 21/52; G06F 21/566; G06F 21/552; G06F 21/126; H04L 67/133
See application file for complete search history.

(56) References Cited

U.S. PATENT DOCUMENTS

| | | | | |
|---|---|---|---|---|
| 9,348,742 | B1* | 5/2016 | Brezinski | G06F 21/566 |
| 10,122,742 | B1* | 11/2018 | Oprea | H04L 63/1425 |
| 10,181,035 | B1* | 1/2019 | Shekokar | H04L 63/1425 |
| 10,558,809 | B1* | 2/2020 | Joyce | G06N 5/046 |
| 2008/0148226 | A1* | 6/2008 | Chen | G06F 21/52 717/109 |

(Continued)

FOREIGN PATENT DOCUMENTS

KR    101328012 B1    11/2013

OTHER PUBLICATIONS

Shaid, Syed Zainudeen Mohd; Maarof, Mohd Aizaini; "In memory detection of Windows API call hooking technique," International Conference on Computer, Communications, and Control Technology (I4CT), Kuching, Malaysia, 2015, pp. 294-298.*

(Continued)

*Primary Examiner* — Victor Lesniewski
(74) *Attorney, Agent, or Firm* — Harness, Dickey & Pierce, P.L.C.

(57) ABSTRACT

Disclosed is a hooking detection method and system that may specify position information of a function referenced by an executable module from an outside or provided to the outside or a unique value of an executable code, and may determine application programming interface (API) hooking based on a classification acquired by comparing unique values or by clustering the unique values.

13 Claims, 10 Drawing Sheets

(56) References Cited

U.S. PATENT DOCUMENTS

| | | | | |
|---|---|---|---|---|
| 2012/0030762 | A1* | 2/2012 | Klein | G06F 21/57 |
| | | | | 726/23 |
| 2012/0036569 | A1* | 2/2012 | Cottrell | H04L 63/0823 |
| | | | | 726/16 |
| 2012/0054868 | A1* | 3/2012 | Ramalingam | G06F 21/554 |
| | | | | 726/24 |
| 2012/0324575 | A1* | 12/2012 | Choi | G06F 21/52 |
| | | | | 726/23 |
| 2013/0290662 | A1* | 10/2013 | Teal | G06F 21/52 |
| | | | | 711/163 |
| 2015/0324590 | A1* | 11/2015 | Krten | G06F 21/64 |
| | | | | 726/26 |
| 2016/0055337 | A1* | 2/2016 | El-Moussa | G06F 21/566 |
| | | | | 726/23 |
| 2016/0164901 | A1* | 6/2016 | Mainieri | H04L 63/1441 |
| | | | | 726/23 |
| 2017/0032118 | A1* | 2/2017 | Carson | G06F 21/566 |
| 2017/0193229 | A1* | 7/2017 | RoyChowdhury | G06F 21/564 |
| 2019/0102543 | A1* | 4/2019 | Lew | G06F 21/552 |
| 2019/0102552 | A1* | 4/2019 | Pavlyushchik | G06F 21/566 |
| 2019/0199736 | A1* | 6/2019 | Howard | H04L 63/1425 |
| 2019/0258490 | A1* | 8/2019 | Reed | G06F 9/3861 |
| 2020/0089883 | A1* | 3/2020 | Morris | G06F 21/52 |
| 2020/0311254 | A1* | 10/2020 | Mondello | H04L 9/3242 |
| 2021/0064747 | A1* | 3/2021 | Fang | H04L 9/0894 |
| 2021/0336973 | A1* | 10/2021 | Leiderfarb | H04L 63/145 |

OTHER PUBLICATIONS

Ding, Hao; Sun, Wenjie; Chen, Yihang; Zhao, Binglin; Gui, Hairen; "Malware Detection and Classification Based on Parallel Sequence Comparison," 5th International Conference on Systems and Informatics (ICSAI), Nanjing, China, 2018, pp. 670-675.*

* cited by examiner

METHOD AND SYSTEM FOR DETECTING HOOKING USING CLUSTERING API INFORMATION

CROSS-REFERENCE TO RELATED APPLICATION(S)

This U.S. non-provisional application and claims the benefit of priority under 35 U.S.C. § 365(c) to Korean Patent Application No. 10-2020-0062769, filed May 26, 2020, the entire contents of which are incorporated herein by reference in their entirety.

BACKGROUND

Field

One or more example embodiments relate to a method and system for detecting hooking through clustering of application programming interface (API) information.

Description of Related Art

When an arbitrary program, for example, a binary or a source code, is given, analyzing and understanding an operation method of the corresponding program is called "reverse engineering." A company that sells a finished product, for example, a binary, may desire the finished product to be difficult to reversely engineer since the product contains technology of the corresponding company as is. As an example of making reverse engineering difficult, various obfuscation techniques are present for a code of a program. For example, obfuscation may be performed by adding insignificant logic or codes at a source code level of the program to a source code or by encrypting or encoding data, such as a character string included in the source code. As another example, obfuscation may be performed by modifying a format of an executable file or an assembly code to make it difficult to interpret a code region for the executable file finally built.

Meanwhile, as a reverse engineering scheme, application programming interface (API) hooking is frequently used to verify an operation state of an application or to modify an operation of the application. The API needs (or is expected) to receive a factor value in a form promised in advance and to return a corresponding result. Therefore, it is possible to abuse a call of the corresponding API to operate in a form unintended by a developer by intercepting the call of the API on a memory and verifying whether the call is present or by modifying an operation method. To detect such API hooking, a method of verifying whether a debugger or a disassembler capable of attempting API hooking is executed or installed, a method of verifying whether a framework capable of performing reversing is executed or installed, or a method of verifying an address value of an API function in use is used in the related art.

However, in the case of the aforementioned related art, there is a possibility of a false positive since API hooking risk is determined indirectly determined depending on whether a program capable of attempting API hooking is executed or installed. Also, when a position of a module loaded to a memory is variable based on a system situation, it is difficult to detect whether hooking is performed based on an address of an API function. Also, when a new type of a hooking program appears or an operation is hidden, or when a position of a module loaded to a memory is changed, it may not be possible to respond to API hooking in a timely manner.

SUMMARY

One or more example embodiments provide a hooking detection method and system that may specify a unique identifier for an executable code or position information of a function referenced by an executable module from an outside or provided to the outside, and may determine application programming interface (API) hooking using a classification acquired by comparing such unique values or by clustering the unique values.

According to at least one example embodiment, there is provided a hooking detection method of a computer apparatus including at least one processor and a memory, the hooking detection method including, by the at least one processor, verifying an offset or an executable code of a target function as an internal function provided from an executable module or as an external function referenced by the executable module in association with the executable module loaded to the memory at an execution time of the executable module; generating an identification value using the offset or the executable code of the target function; and determining whether the executable module is hooked based on the generated identification value.

The verifying the offset or the executable code may include verifying external function information referenced by the executable module; acquiring a start address of an external module referenced by the external function information; acquiring a start address of an external function referenced by the external function information; and verifying a difference between the start address of the external function and the start address of the external module as the offset of the target function.

The verifying may further include determining that hooking is present with respect to the executable module or the target function in response to the start address of the external address not being included in a start address and end address range of the external module.

The verifying the offset or the executable code may include verifying internal function information provided from the executable module; verifying a start address of the executable module; verifying a start address of an internal function provided to an outside based on the internal function information; and verifying a difference between the start address of the internal function and the start address of the executable module as the offset of the target function.

The verifying the offset or the executable code may further include determining that hooking is present with respect to the executable module or the target function in response to the start address of the internal function not being included in a start address and end address range of the executable module.

The verifying the offset or the executable code may include verifying external function information referenced by the executable module; acquiring a start address of the external function referenced by the external function information; and acquiring an executable code stored in the address of the external function.

The acquiring the executable code may include acquiring the executable code from the start address of the external function to an address corresponding to a size of a move instruction, or acquiring the executable code from the start address to an end address of the external function.

The verifying the offset or the executable code may include verifying internal function information from the executable module; acquiring an address of an internal function provided to an outside based on the internal function information; and acquiring an executable code stored in the address of the internal function.

The acquiring the executable code may include acquiring executable code from a start address of the internal function to an address corresponding to a size of a move instruction, or acquiring the executable code from the start address to an end address of the internal function.

The generating the identification value may include generating the offset or the executable code of the target function as the identification value and linking the identification value with at least one of an identifier of a module that includes the target function and an identifier of the target function.

The verifying the offset or the executable code may include verifying an offset or an executable code for each internal function provided from the executable module or each external function referenced by the executable module, and the generating the identification value may include generating a single piece of hash information about offsets or executable codes verified for all the internal functions or all of the external functions as the identification value and linking the identification value with an identifier of a corresponding module.

The determining whether the executable modules is hooked may include comparing the generated identification value to a previous identification value and determining whether the executable module is hooked based on the comparison.

The previous identification value may include an offset or an executable code of the target function verified in advance for the executable module immediately after building a package file that includes the executable module, an offset or an executable code of the target function verified in advance for the executable module at a previous execution point in time of the executable module, or an offset or an executable code of the target function verified in advance for the executable module at desired intervals.

The determining whether the executable modules is hooked may include transmitting the generated identification value to a server, and the server may be configured to cluster identification values collected from clients based on an identifier of a linked module or an identifier of the target function, to compare the clustered identification values, and to determine a hooking state of a specific module or a specific target function for each cluster.

The server may be configured to determine identical identification values among identification values included in a specific cluster as normal identification values and to determine a specific module or a specific target function of a client corresponding to remaining identification values to be in a hooking state.

According to at least one example embodiment, there is provided a hooking detection method of a computer apparatus including at least one processor and a memory, the hooking detection method including, by the at least one processor, receiving identification values from a plurality of clients, each of the identification values being generated based on an offset or an executable code of a target function as an internal function provided from an executable module or an external function referenced by the executable module in association with the executable module loaded to each of memories of the plurality of clients; clustering the received identification values based on an identifier of a corresponding module or an identifier of a corresponding target function; comparing identification values about an arbitrary cluster; and determining a hooking state of a module or a target function corresponding to the arbitrary cluster.

According to at least one example embodiment, there is provided a non-transitory computer-readable record medium storing instructions that, when executed by a processor, cause the processor to perform the hooking detection method.

According to at least one example embodiment, there is provided a computer apparatus including at least one processor configured to execute computer-readable instructions. The at least one processor is configured to receive identification values from a plurality of clients, each of the identification values including an offset or an executable code of a target function as an internal function provided from an executable module or an external function referenced by the executable module in association with the executable module loaded to each of memories of the plurality of clients, cluster the received identification values based on an identifier of a corresponding module or an identifier of a corresponding target function, and compare identification values about an arbitrary cluster and determine a hooking state of a module or a target function corresponding to the arbitrary cluster.

According to some example embodiments, it is possible to specify a unique identifier for an executable code or position information of a function referenced by an executable module from an outside or provided to the outside, and to determine application programming interface (API) hooking using a classification acquired by comparing such unique values or by clustering the unique values.

Further areas of applicability will become apparent from the description provided herein. The description and specific examples in this summary are intended for purposes of illustration only and are not intended to limit the scope of the present disclosure.

DETAILED DESCRIPTION

Figure 1:
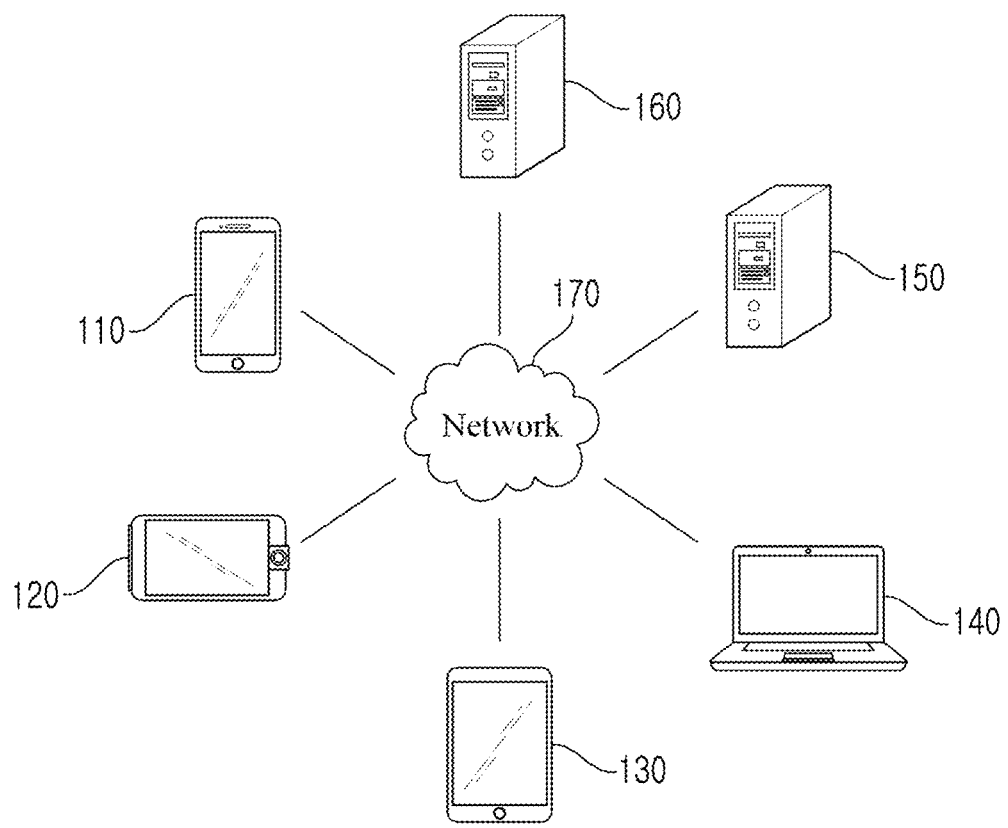
FIG. 1 is a diagram illustrating an example of a network environment according to at least one example embodiment.

One or more example embodiments will be described in detail with reference to the accompanying drawings.

Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A hooking detection system according to the example embodiments may be implemented by at least one computer apparatus and a hooking detection method according to the example embodiments may be performed through at least one computer apparatus included in the hooking detection system. A computer program according to the example embodiments may be installed and executed on the computer apparatus and the computer apparatus may perform the hooking detection method according to the example embodiments under control of the executed computer program. The aforementioned computer program may be stored in a non-transitory computer-readable record medium to computer-implement the hooking detection method in conjunction with the computer apparatus.

FIG. 1 illustrates an example of a network environment according to at least one example embodiment. Referring to FIG. 1, the network environment may include a plurality of electronic devices 110, 120, 130, and/or 140, a plurality of servers 150 and/or 160, and/or a network 170. FIG. 1 is provided as an example only. A number of electronic devices or a number of servers is not limited thereto. Also, the network environment of FIG. 1 is provided as an example of environments applicable to the example embodiments and the environment applicable to the example embodiments is not limited to the network environment of FIG. 1.

Each, or one or more, of the plurality of electronic devices 110, 120, 130, and/or 140 may be a fixed terminal or a mobile terminal that is configured as a computer apparatus. For example, the plurality of electronic devices 110, 120, 130, and/or 140 may be a smartphone, a mobile phone, a navigation device, a computer, a laptop computer, a digital broadcasting terminal, a personal digital assistant (PDA), a portable multimedia player (PMP), a tablet PC, and/or the like. For example, although FIG. 1 illustrates a shape of a smartphone as an example of the electronic device 110, the electronic device 110 used herein may refer to one of various types of physical computer apparatuses capable of communicating with other electronic devices 120, 130, and/or 140, and/or the servers 150 and/or 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and/or the Internet. Also, the network 170 may include at least one of network topologies that include a bus network, a star network, a ring network, a mesh network, a star-bus network, a tree or hierarchical network, and/or the like. However, they are provided as examples only.

Each, or one or more, of the servers 150 and 160 may be configured as a computer apparatus or a plurality of computer apparatuses that provides an instruction, a code, a file, content, a service, etc., through communication with the plurality of electronic devices 110, 120, 130, and/or 140 over the network 170. For example, the server 150 may be a system that provides a service to the plurality of electronic devices 110, 120, 130, and/or 140 connected over the network 170. For example, the service may include a file distribution service, a map service, a content providing service, a group call service and/or a voice conference service, a messaging service, a mail service, a social network service, a translation service, a financial service, a payment service, and/or a search service.

Figure 2:
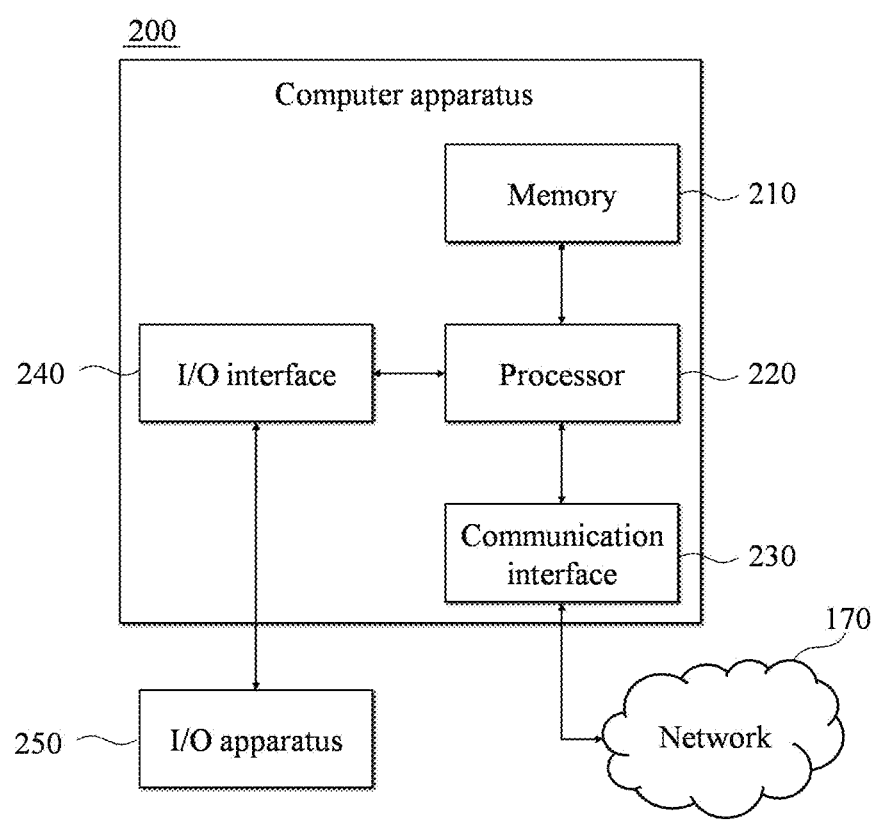
FIG. 2 is a diagram illustrating an example of a computer apparatus according to at least one example embodiment.

FIG. 2 is a block diagram illustrating an example of a computer apparatus according to at least one example embodiment. Each, or one or more, of the plurality of electronic devices 110, 120, 130, and/or 140 and/or the servers 150 and/or 160 may be implemented in a computer apparatus 200 of FIG. 2.

Referring to FIG. 2, the electronic device 220 may include a memory 210, a processor 220, a communication interface 230, and/or an input/output (I/O) interface 240. The memory 210 may include a permanent mass storage device, such as random access memory (RAM), a read only memory (ROM), and/or a disk drive, as a non-transitory computer-readable record medium. The permanent mass storage device, such as ROM and/or disk drive, may be included in the computer apparatus 200 as a permanent storage device separate from the memory 210. Also, an OS and/or at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software components may be loaded to the memory 210 based on a computer program installed by files provided over the network 170.

The processor 220 may be configured to process instructions of a computer program by performing basic arithmetic operations, logic operations, and/or I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and other apparatuses, for example, the aforementioned storage devices, over the network 170. For example, the processor 220 of the computer apparatus 200 may transfer data, a file, and/or a request created based on a program code stored in the storage device such as the memory 210, to the other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, data, etc., received through the communication interface 230 may be transferred to the processor 220 or the memory 210, and a file, etc., may be stored in a storage medium, for example, the permanent storage device, further includable in the computer apparatus.

The I/O interface 240 may be a device used for interface with an I/O apparatus 250. For example, an input device may include a device, such as a microphone, a keyboard, a mouse, etc., and an output device may include a device, such as a display, a speaker, etc. As another example, the I/O interface 240 may be a device for interface with an apparatus in which an input function and an output function are integrated into a single function, such as a touchscreen. At least one of the I/O apparatus 250 may be configured as a single device with the computer apparatus 200.

According to other example embodiments, the computer apparatus 200 may include a number of components greater than or less than a number of components shown in FIG. 2. However, there is no need to clearly illustrate many components according to the related art. For example, the computer apparatus 200 may include at least a portion of the I/O apparatus 250, or may further include other components, for example, a transceiver, a database (DB), and/or the like.

Figure 3:
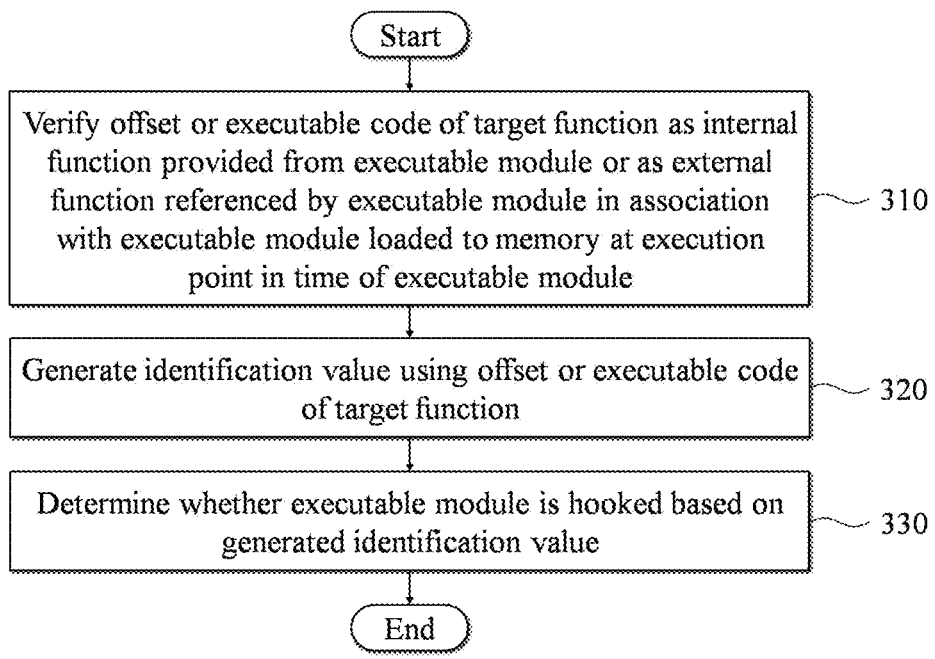
FIG. 3 is a flowchart illustrating an example of a hooking detection method according to at least one example embodiment.

FIG. 3 is a flowchart illustrating an example of a hooking detection method of a client according to at least one example embodiment. The hooking detection method of FIG. 3 may be performed by the computer apparatus 200 of a client that executes a computer program using at least an executable module that is a target of a hooking detection. Here, the processor 220 of the computer apparatus 200 may be configured to execute a control instruction according to a code of at least one computer program or a code of an OS included in the memory 210. Here, the processor 220 may control the computer apparatus 200 to perform operations 310 to 330 included in the hooking detection method of FIG. 3 in response to the control instruction provided from a code stored in the computer apparatus 200.

Referring to FIG. 3, in operation 310, the computer apparatus 200 may verify an offset or an executable code of a target function as an internal function provided from an executable module or an external function referenced by the executable module in association with the executable module loaded to the memory 210 at an execution point in time of the executable module.

A single executable module may refer to a function (an external function from perspective of the corresponding executable module, hereinafter, "external function") included in another external module based on an application programming interface (API) call and may also provide a function (an internal function from perspective of the corresponding executable module, hereinafter, "internal function") of the executable module through an API call from an external module. Here, the computer apparatus 200 may verify the offset or the executable code of the target function as the external function or the internal function. The offset may be used as a unique value for a position of the target function and the executable code may be used as a unique value about contents of the target function. Such unique values may be used to generate an identification value in operation 320. At least one of an offset of the external function and an executable code of the external function may be used and/or at least one of an offset of the internal function and an executable code of the internal function may be used to generate the identification value. A method of acquiring an offset or an executable code of a function is further described with reference to the following FIGS. 4 to 7.

In operation 320, the computer apparatus 200 may generate an identification value using the offset or the executable code of the target function. In one example embodiment, the computer apparatus 200 may generate the identification value by linking the offset or the executable code of the target function with at least one of an identifier of a module that includes the target function and an identifier of the target function. Here, the module that includes the target function may be an external module for the external function and may be an executable module for the internal function. Also, the identifier of the module may be, for example, a module name and an identifier of a function may be a function name. However, it is provided as an example only. Any value capable of identifying a specific module or a specific function may be used. In another example embodiment, in operation 310, the computer apparatus 200 may verify an offset or an executable code for each, or one or more, of all, or at least some, internal functions provided from the executable module or all, or at least some, external functions referenced by the executable module. In this case, in operation 320, the computer apparatus 200 may generate the identification value by linking a single piece of hash information about offsets or executable codes verified for all, or at least some, of the internal functions or the external functions with an identifier of a corresponding module.

In operation 330, the computer apparatus 200 may determine whether the executable module is hooked based on the generated identification value. When the target function is hooked in response to occurrence of API hooking and not the target function but another function is executed, an offset and/or an executable code of the other function may differ from the offset and/or the executable code of the target function. It may represent that an identification value acquired for the same module and/or function varies depending on whether API hooking occurs. Therefore, the computer apparatus 200 may determine whether the executable module is hooked based on the generated identification value. In detail, for example, the computer apparatus 200 may determine whether the executable module is hooked by comparing the generated identification value to a previous identification value. Here, when the generated identification value differs from the previous identification value, the computer apparatus 200 may verify that hooking has occurred with respect to an executing executable module and/or target function. Here, the previous identification value may include (1) an offset or an executable code of the target function verified in advance for the executable module immediately after building a package file that includes the executable module, (2) an offset or an executable code of the target function verified in advance for the executable module at a previous execution point in time of the executable module, and/or (3) an offset or an executable code of the target function verified in advance for the executable module at desired intervals.

For example, when the identification value includes the offset of the target function, that the identification value generated for the target function differs from the previous identification value previously generated for the corresponding target function may represent that API hooking has occurred with respect to the target function. As another example, when the identification value includes hash information about offsets or executable codes of all, ore one or more, of the internal functions provided from the executable module, that the corresponding identification value differs from the previous identification value may represent that API hooking has occurred with respect to at least one of internal functions of the corresponding executable module. As another example, when the identification value includes hash information about offsets or executable codes of all, or one or more, of the external functions provided from the executable module, that the corresponding identification value differs from the previous identification value may represent that API hooking has occurred with respect to a specific external module, particularly, at least one of external functions referenced by the corresponding external module.

The hooking detection method according to the example embodiment may determine whether hooking has occurred by prespecifying a unique value, for example, a previous identification value, about contents or position information of an API function related to an executable function and by comparing an identification value generated at an execution point in time of the executable function to the previous identification value. Therefore, the presence of hooking may be more accurately determined and/or the risk of false positives of the presence of hooking may be reduced. For example, even when a new type of a hooking program appears or an operation is hidden, or when a position of a module loaded to a memory is changed, it may be possible to respond to API hooking in a timely manner. Also, if hooking may be detected more quickly, using less processing power, and/or using less memory using the example embodiments of the inventive concepts.

Figure 4:
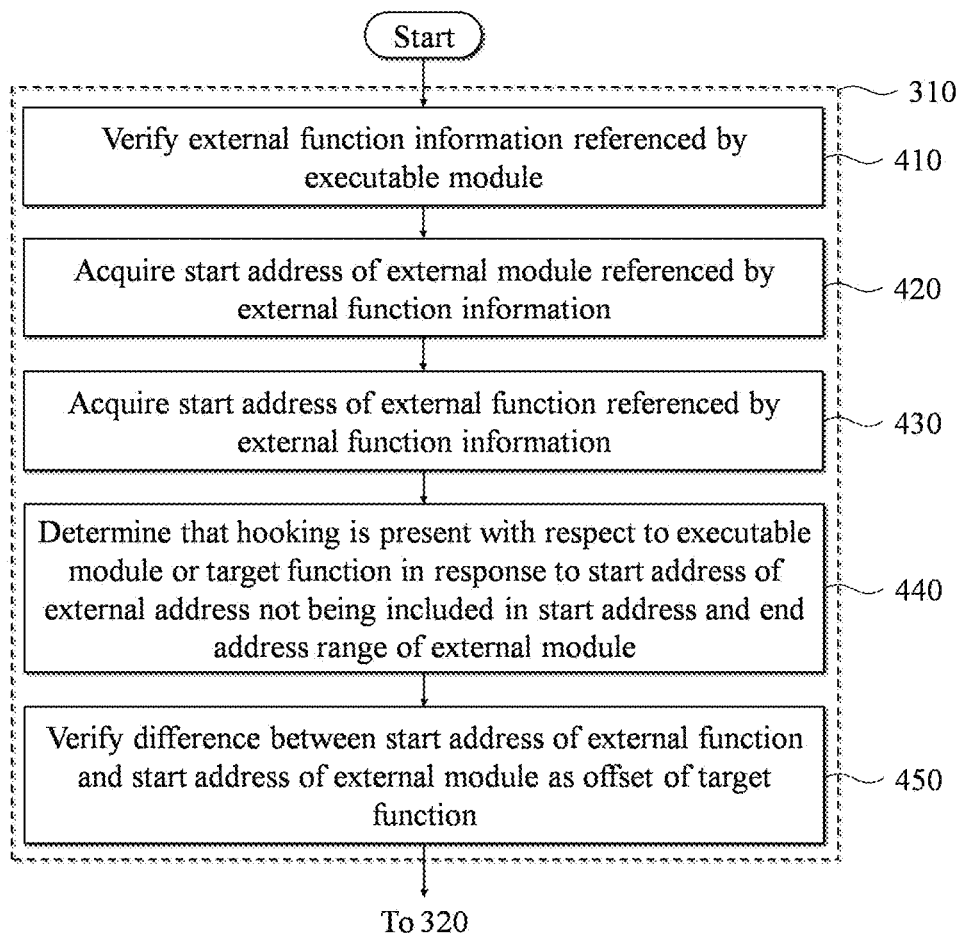
FIG. 4 is a flowchart illustrating an example of a process of verifying an offset of an external function according to at least one example embodiment.

FIG. 4 is a flowchart illustrating an example of a process of verifying an offset of an external function according to at least one example embodiment. Operations 410 to 450 of FIG. 4 may be included in operation 310 of FIG. 3 and performed by the computer apparatus 200.

Referring to FIG. 4, in operation 410, the computer apparatus 200 may verify external function information referenced by the executable module. For example, the external function information may correspond to an import address table (IAT) defined for the executable module.

In operation 420, the computer apparatus 200 may acquire a start address and/or an end address of an external module referenced by the external function information.

In operation 430, the computer apparatus 200 may acquire a start address of an external function referenced by the external function information.

In operation 440, when the start address of the external function is not included in a start address and end address range of the external module, the computer apparatus 200 may determine that hooking is present with respect to the executable module or the target function. The start address of the external function included in the external module needs (or is expected) to be included within the start address and end address range of the external module. If the external function is hooked and another function is executed, a start address of the other function may be recorded in the external function information as the start address of the external function and the start address of the other function may be deviated from the start address and end address range of the external module. Therefore, in this case, whether hooking is present may be determined without using the offset as the identification value. In this case, operation 450 may be omitted, and hooking may be detected more quickly. Also, if hooking may be detected more quickly, using less processing power, and/or using less memory using the example embodiments of the inventive concepts.

In operation 450, the computer apparatus 200 may verify a difference between the start address of the external function and the start address of the external module as the offset of the target function. The offset may represent a relative address of the external function with respect to the start address of the external module. Although the start address of the external module varies at each, or one or more, execution point in time, the offset of the external function does not vary. Therefore, if the identification value including the offset differs from the previous identification value, it may represent that hooking has occurred with respect to the corresponding external function and another function is being executed.

Figure 5:
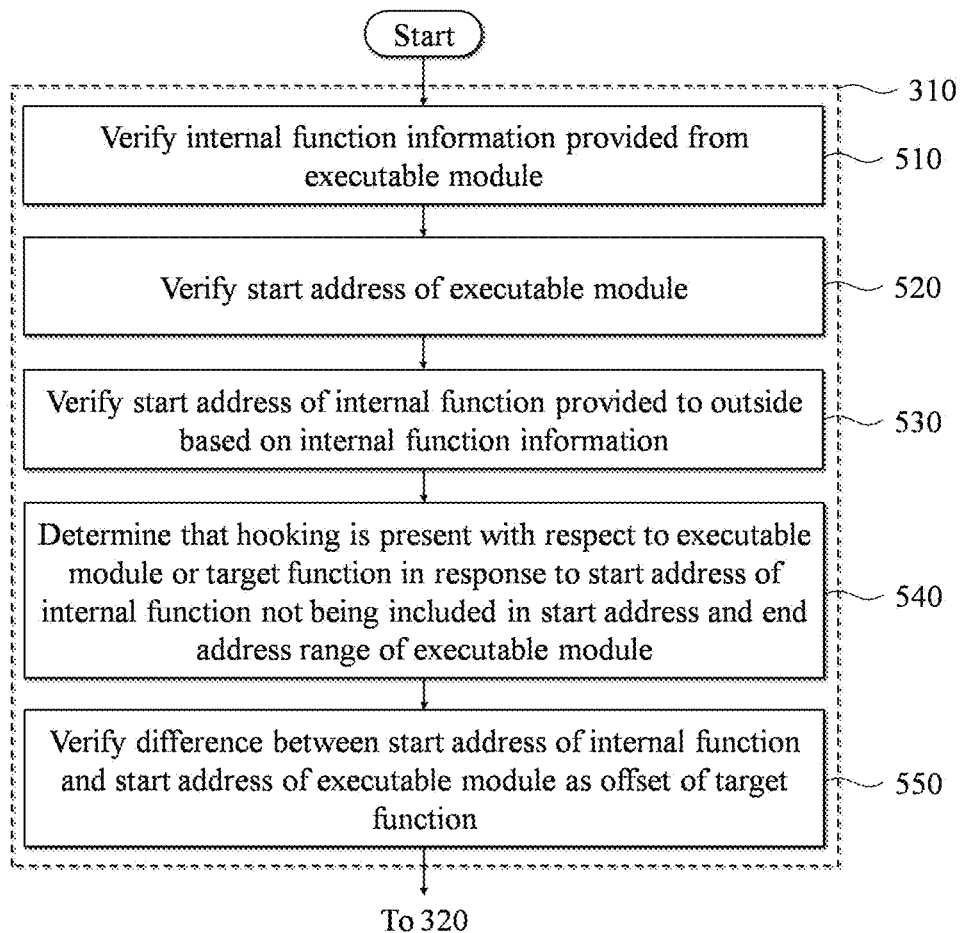
FIG. 5 is a flowchart illustrating an example of a process of verifying an offset of an internal function according to at least one example embodiment.

FIG. 5 is a flowchart illustrating an example of a process of verifying an offset of an internal function according to at least one example embodiment. Operations 510 to 550 of FIG. 5 may be included in operation 310 of FIG. 3 and performed by the computer apparatus 200.

Referring to FIG. 5, in operation 510, the computer apparatus 200 may verify internal function information provided from the executable module. For example, the internal function information may correspond to an export address table (EAT) defined for the executable module.

In operation 520, the computer apparatus 200 may verify a start address and/or an end address of the executable module.

In operation 530, the computer apparatus 200 may verify a start address of the internal function provided to an outside based on internal function information.

In operation 540, when the start address of the internal function is not included in a start address and end address range of the executable module, the computer apparatus 200 may verify that hooking is present with respect to the executable module or the target function. The start address of the internal function included in the executable module needs (or is expected) to be included within the start address and end address range of the executable module. If the internal function is hooked and another function is executed, a start address of the other function may be recorded in the internal function information as the start address of the internal function and the start address of the other function may be deviated from the start address and end address range of the executable module. Therefore, in this case, whether hooking is present may be immediately determined without using the offset as the identification value.

In operation 550, the computer apparatus 200 may verify a difference between the start address of the internal function and the start address of the executable module as the offset of the target function. The offset may represent a relative address of the internal function with respect to the start address of the executable module. Although the start address of the executable module is changed at each, or one or more, execution point in time, the offset of the internal function may not vary. Therefore, if the identification value that includes the offset differs from the previous identification value, it may represent that hooking has occurred with respect to the corresponding internal function and another function is being executed.

Figure 6:
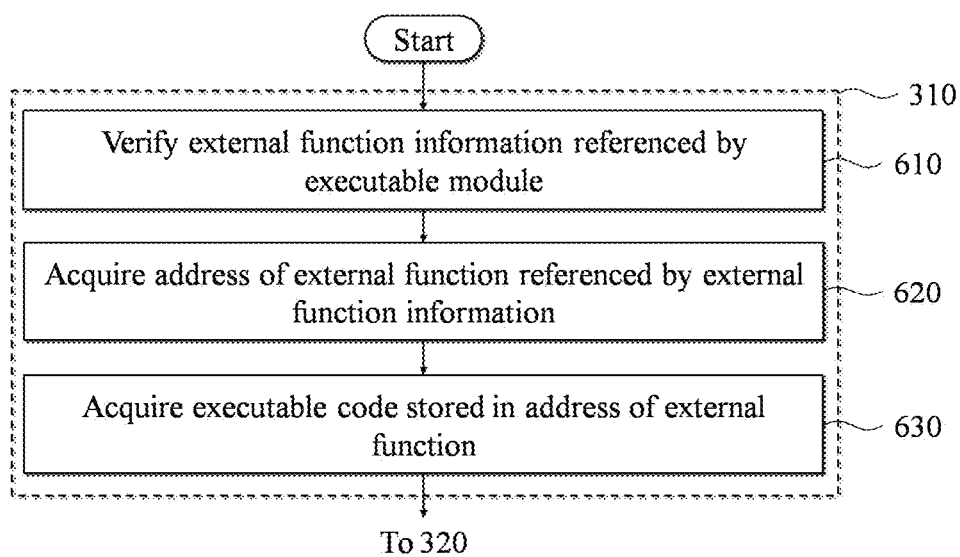
FIG. 6 is a flowchart illustrating an example of a process of verifying an executable code of an external function according to at least one example embodiment.

FIG. 6 is a flowchart illustrating an example of a process of verifying an executable code of an external function according to at least one example embodiment. Operations 610 to 630 of FIG. 6 may be included in operation 310 of FIG. 3 and performed by the computer apparatus 200.

Referring to FIG. 6, in operation 610, the computer apparatus 200 may verify external function information referenced by the executable module. As described above, the external function information may correspond to an IAT defined for the executable module.

In operation 620, the computer apparatus 200 may acquire an address of the external function referenced by the external function information. For example, the address of the external function may include a start address of the external function recorded in the external function information.

In operation 630, the computer apparatus 200 may acquire an executable code stored in the address of the external function.

In one example embodiment, the computer apparatus 200 may acquire an executable code from the start address of the external function to an address corresponding to a size of a move instruction. Here, the move instruction may correspond to a hooking instruction. For example, when the hooking instruction is inserted into the start address of the external function, the executable code from the start address of the external function to the address corresponding to the size of the move instruction may correspond to the hooking instruction. That is, executable codes acquired before and after the occurrence of hooking may vary. If an identification value that includes the executable code differs from the previous identification value, it may represent that hooking has occurred with respect to the corresponding external function and another function is being executed.

In another example embodiment, the computer apparatus 200 may acquire an executable code from the start address to an end address of the external function. It may represent that the entire executable code for the external function is acquired. In this case, if the hooking instruction is inserted into the external function, the executable code may vary. If the identification value that includes the executable code differs from the previous identification value, it may represent that hooking has occurred with respect to the corresponding external function and another function is being executed.

Figure 7:
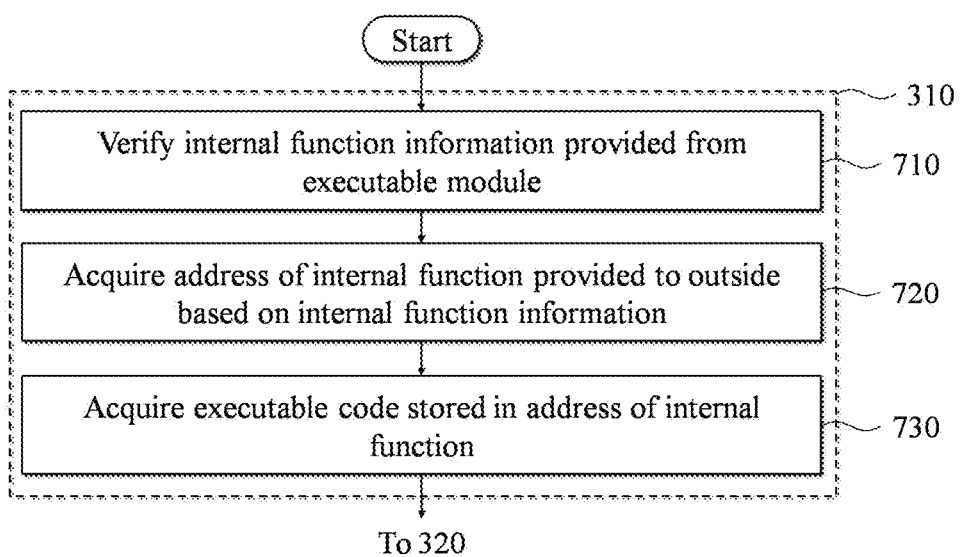
FIG. 7 is a flowchart illustrating an example of a process of verifying an executable code of an internal function according to at least one example embodiment.

FIG. 7 is a flowchart illustrating an example of a process of verifying an executable code of an internal function according to at least one example embodiment. Operations 710 to 730 of FIG. 7 may be included in operation 310 of FIG. 3 and performed by the computer apparatus 200.

Referring to FIG. 7, in operation 710, the computer apparatus 200 may verify internal function information provided from the executable module. As described above, the internal function information may correspond to an EAT defined for the executable module.

In operation 720, the computer apparatus 200 may acquire an address of an internal function provided to an outside based on the internal function information. Here, the address of the internal function may include a start address of the internal function.

In operation 730, the computer apparatus 200 may acquire an executable code stored in the address of the internal function. Even in this case, the computer apparatus 200 may acquire an executable code from a start address of the internal function to an address corresponding to a size of a move instruction or may acquire an executable code from the start address to an end address of the internal function. When the hooking instruction is inserted into the internal function and the executable code varies, an identification value that includes the executable code and the previous identification value may vary, which may make it possible to detect the occurrence of hooking with respect to the internal function.

The identification value may be generated to include (1) an offset of the external function, (2) an offset of the internal function, (3) an executable code of the external function, and/or (4) an executable code of the internal function. Also, the identification value may be generated to include at least two of (1) to (4). As described above, a value converted from offsets or executable codes of all, or one or more, of the API functions of a module to a single hash function may be generated as an identification value.

Figure 8:
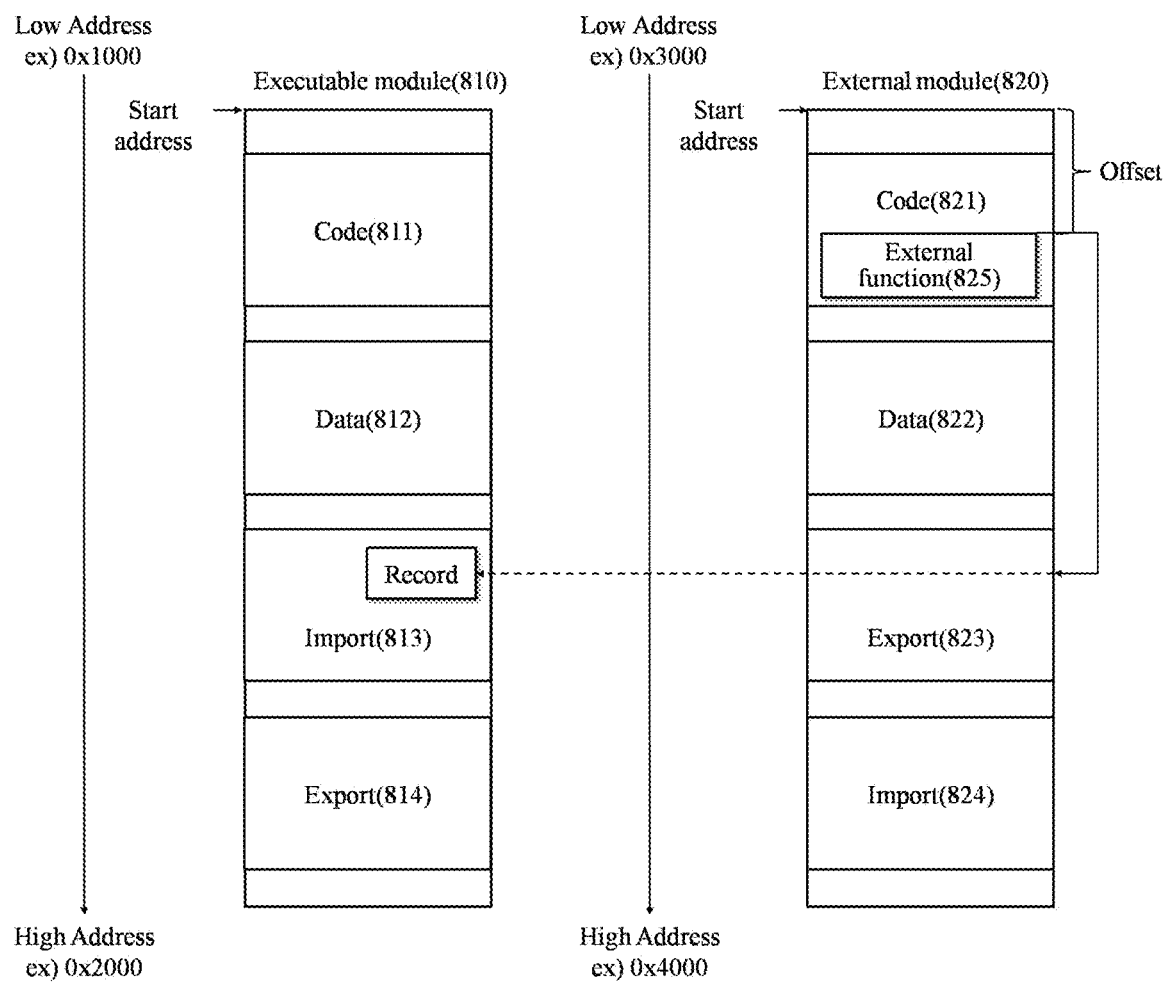
FIGS. 8 and 9 illustrate examples of acquiring an offset or an executable code according to at least one example embodiment.
Figure 9:
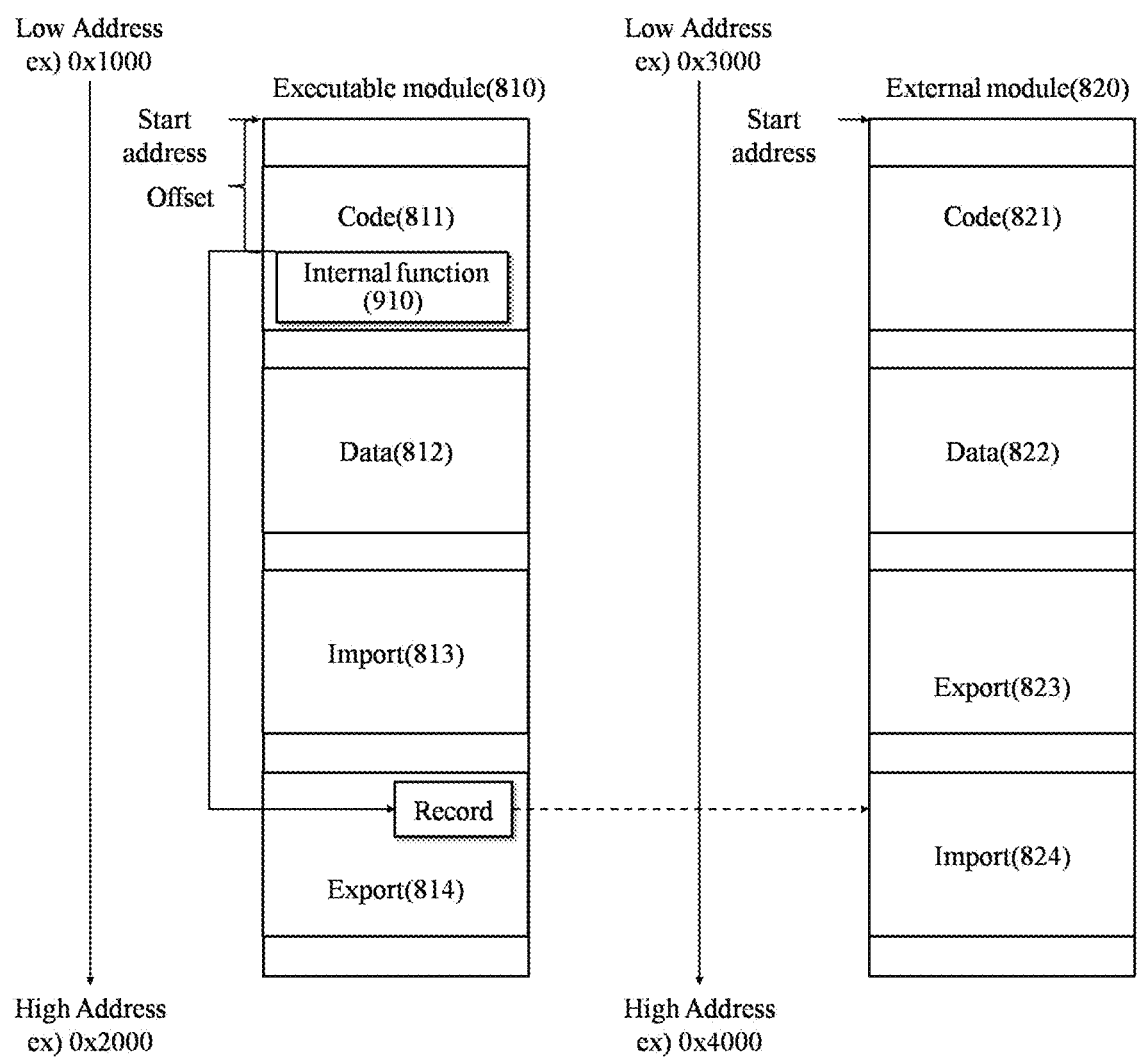

FIGS. 8 and 9 illustrate examples of acquiring an offset according to at least one example embodiment. FIGS. 8 and 9 illustrate an example of an executable module 810 and an external module 820 loaded on the memory 210 of the computer apparatus 200. The executable module 810 may include a code section (Code) 811, a data section (Data) 812, an IAT section (Import) 813, and/or an EAT section (Export) 814. Similarly, the external module 820 may include a code section (Code) 821, a data section (Data) 822, an EAT section (Export) 823, and/or an IAT section (Import) 824.

Here, referring to FIG. 8, with respect to an external function 825 referenced by the executable module 810, a start address of the external module 820 and a start address of the external function 825 may be recorded in the IAT section (Import) 813 of the executable module 810 and an offset of the external function 825 may be acquired through a difference between the two start addresses.

Referring to FIG. 9, a start address of an internal function 910 provided from the executable module 810 to an outside may be recorded in the EAT section (Export) 814 of the executable module 810 and referenced by the external module 820. Here, an offset of the internal function 910 may be acquired through a difference between the start address of the executable module 810 and the start address of the internal function 910 verifiable in the EAT section (Export) 814.

It may be easily understood that an executable code may be acquired based on the start address of the external function 825 or the start address of the internal function 910.

Meanwhile, example embodiments of determining whether hooking is present by comparing a current identification value and a previous identification value in the computer apparatus 200 as a terminal of a client on which a computer program is executed are described. According to another example embodiment, whether hooking is present with respect to a specific module or a specific function of a client may be determined by clustering identification values at a server.

For example, the computer apparatus 200 implemented as a client in FIG. 3 may transmit the identification value generated in operation 330 to a server. In this case, the server may cluster identification values collected from clients based on an identifier of a linked module or an identifier of a target function, may compare the clustered identification values, and/or may determine a hooking state of a specific module or a specific target function for each, or one or more, cluster. In detail, the server may determine identical identification values among identification values included in a specific cluster as normal identification values and may determine a specific module or a specific target function of a client corresponding to remaining identification values to be in a hooking state. In detail, for example, it is assumed that each, or one or more, of 1000 clients transmits a single identification value to a server with respect to a function B of a module A. That is, it is assumed that a total of 1000 identification values are transmitted to the server. Here, when 997 identification values have an identical value and three identification values have different values, the server may determine that hooking has occurred in clients corresponding to the three identification values having different values with respect to the module A and/or the function B. As described above, the offset or the executable code is identical regardless of a position at which the executable module or the external module is loaded on a memory. Therefore, the occurrence of hooking with respect to the corresponding module and/or function may be recognized with respect to clients having transmitted different identification values based on an aspect that an identification value that includes the offset or the executable code differs from that of another client.

To this end, the server may cluster identification values transmitted from clients during a desired period. Subsequently, the server may determine whether hooking is present in real time based on the identification values transmitted from the clients. For example, it is assumed that 500 identical identifiers aaa are received through clustering during an initial desired period of time. Subsequently, when an identifier aaa is received from a client 1, the server may determine that hooking has not occurred in the client 1 in real time based on a set of the clustered identifiers aaa. On the contrary, when an identifier bbb different from the identifier aaa is received from a client 2, the server may determine that hooking has occurred in the client 2 based on a set of clustered identifier aaa. According to another example embodiment, the server may determine whether hooking has occurred in clients every, or one or more, desired period. For example, the server may cluster identification values transmitted from clients during a corresponding period of time every, or one or more, desired period, may compare the clustered identification values, and may recognize occurrence of hooking has occurred with respect to a corresponding module and/or function in a small number of clients having transmitted different identification values.

Figure 10:
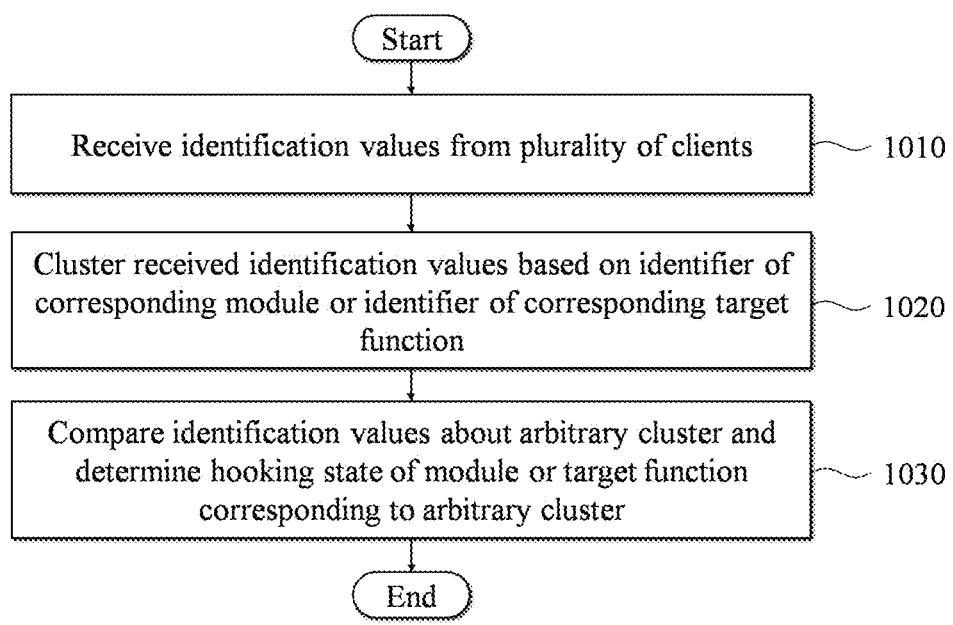
FIG. 10 is a flowchart illustrating an example of a hooking detection method of a server according to at least one example embodiment.

FIG. 10 is a flowchart illustrating an example of a hooking detection method of a server according to at least one example embodiment. The hooking detection method according to the example embodiment may be performed by the computer apparatus 200 of a server that receives identification values from a plurality of clients. Here, the processor 220 of the computer apparatus 200 may be configured to execute a control instruction according to a code of at least one computer program or a code of an OS included in the memory 210. Here, the processor 220 may control the computer apparatus 200 to perform operations 1010 to 1030 included in the hooking detection method of FIG. 10 in response to the control instruction provided from the code stored in the computer apparatus 200.

Referring to FIG. 10, in operation 1010, the computer apparatus 200 may receive identification values from a plurality of clients. As described above, each, or one or more, of the identification values may be generated based on an offset or an executable code of a target function as an internal function provided from an executable module or as an external function referenced by the executable module in association with the executable module loaded to a memory of each, or one or more, of the plurality of clients. The identification value may be generated to include (1) an offset of the external function, (2) an offset of the internal function, (3) an executable code of the external function, and/or (4) an executable code of the internal function. Also, the identification value may be generated to include at least two of (1) to (4). As described above, a value converted from offsets or executable code of all, or one or more, the API functions of a module to a single hash function may be generated as an identification value.

In operation 1020, the computer apparatus 200 may cluster the received identification values based on an identifier of a corresponding module and/or an identifier of a corresponding target function. That is, the identification values may be classified by module and/or function.

In operation 1030, the computer apparatus 200 may compare identification values about an arbitrary cluster and may determine a hooking state of a module and/or a target function corresponding to the arbitrary cluster. For example, the computer apparatus 200 may determine identical identification values among identification values included in the arbitrary cluster as normal identification values and may determine a module and/or a target function of a client corresponding to a remaining identification value excluding the identification values determined as the normal identification values from among the identification values included in the arbitrary cluster to be in a hooking state. Therefore, it is possible to detect a number of clients that are expected to API hooking at once. Also, as the number of clients increases, the detection efficiency of API hooking may increase.

According to example embodiments, it is possible to specify a unique identifier for an executable code and/or position information of a function referenced by an executable module from an outside and/or provided to the outside, and to determine API hooking using a classification acquired by comparing such unique values or by clustering the unique values.

The systems or the apparatuses described above may be implemented using hardware components, software components, and/or a combination thereof. For example, the apparatuses and the components described herein may be implemented using one or more processing circuitries including general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs and/or may temporarily store the same for execution or download. Also, the media may be various types of recording devices and/or storage devices in a form in which one or a plurality of hardware components are combined. Without being limited to media directly connected to a computer system, the media may be distributed over the network. Examples of the media include magnetic media such as hard disks, floppy disks, and/or magnetic tapes; optical media such as CD-ROM and/or DVDs; magneto-optical media such as floptical disks; and/or hardware devices that are specially configured to store and perform program instructions, such as ROM, RAM, flash memory, and the like. Examples of other media may include recording media and/or storage media managed by app store that distributes applications and/or a site, a server, and the like that supplies and/or distributes other various types of software. Examples of a program instruction may include a machine language code produced by a compiler and a high-language code executable by a computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, and/or circuit are combined in a different manner, and/or replaced or supplemented by other components or their equivalents.

What is claimed is:

1. A hooking detection method of a computer apparatus comprising at least one processor and a memory, the hooking detection method comprising:

verifying, by the at least one processor, an executable code of a target function as an internal function provided from an executable module or as an external function referenced by the executable module in association with the executable module loaded to the memory at an execution time of the executable module by verifying information on the target function, acquiring a start address and an end address of the target function based on the information on the target function, and acquiring the executable code of the target function from the start address to the end address of the target function, the executable code including at least one instruction;

generating, by the at least one processor, an identification value using the executable code of the target function, the identification value including at least a portion of the executable code of the target function or a hash value into which the at least a portion of the executable code is converted by the hash function; and determining, by the at least one processor, that the executable module is hooked based on the generated identification value in response to a determination that the executable code of the target function has been modified based on a comparison of the generated identification value and a previously generated identification value associated with the target function, wherein the determining whether the executable module is hooked comprises transmitting the generated identification value to a server, and wherein the server is configured to cluster identification values collected from clients based on identifiers of target functions associated with the identification values such that the identification values are clustered into a respective cluster for each target function of the target functions, compare the clustered identification values in the respective cluster for said each target function, and determine a hooking state of said each target function, based on the comparison result, by
determining identical identification values among the clustered identification values included in the respective cluster as normal identification values representing a non-hooking state for a respective target function of the target functions, and
determining non-identical identification values other than the identical identification values among the clustered identification values includes in the respective cluster as identification values representing a hooking state for the clustered target function.

2. The hooking detection method of claim 1, wherein the verifying the executable code comprises further verifying an offset of the target function by:
verifying external function information referenced by the executable module;
acquiring a start address of an external module referenced by the external function information;
acquiring a start address of an external function referenced by the external function information; and
verifying a difference between the start address of the external function and the start address of the external module as the offset of the target function.

3. The hooking detection method of claim 2, wherein the verifying the offset further comprises:
determining that hooking is present with respect to the executable module or the target function in response to the start address of the external function not being included in a start address and end address range of the external module.

4. The hooking detection method of claim 1, wherein the verifying the executable code comprises further verifying an offset of the target function by:
verifying internal function information provided from the executable module;
verifying a start address of the executable module;
verifying a start address of an internal function provided to an outside based on the internal function information; and
verifying a difference between the start address of the internal function and the start address of the executable module as the offset of the target function.

5. The hooking detection method of claim 4, wherein the verifying the offset further comprises:
determining that hooking is present with respect to the executable module or the target function in response to the start address of the internal function not being included in a start address and end address range of the executable module.

6. The hooking detection method of claim 1, wherein the target function is the external function,
the verifying the information comprises verifying the information on the external function referenced by the executable module,
the acquiring the start address and the end address comprises acquiring the start address and the end address of the external function referenced by the information on the external function, and
the acquiring the executable code comprises acquiring the executable code of the external function from the start address to the end address of the external function.

7. The hooking detection method of claim 1, wherein, the target function is the external function, the verifying the information comprises verifying information on the internal function from the executable module,
the acquiring the start address and the end address comprises acquiring the start address and the end address of the internal function provided to an outside based on the information on the internal function, and
the acquiring the executable code comprises acquiring the executable code of the internal function from the start address to the end address of the internal function.

8. The hooking detection method of claim 1, wherein the generating the identification value comprises:
configuring the executable code of the target function as the identification value; and
linking the identification value with at least one of an identifier of a module that comprises the target function or an identifier of the target function.

9. The hooking detection method of claim 1, wherein the verifying the executable code comprises verifying an executable code for each internal function provided from the executable module, or each external function referenced by the executable module, and
the generating the identification value comprises generating a single piece of hash information about executable codes verified for all the internal functions or all of the external functions as the identification value and linking the identification value with an identifier of a corresponding module.

10. The hooking detection method of claim 1, wherein the previously generated identification value comprises:
an executable code of the target function verified in advance for the executable module immediately after building a package file that comprises the executable module;
an executable code of the target function verified in advance for the executable module at a previous execution point in time of the executable module; or
an executable code of the target function verified in advance for the executable module at desired intervals.

11. A non-transitory computer-readable record medium storing instructions that, when executed by a processor, cause the processor to perform the hooking detection method of claim 1.

12. A hooking detection method of a computer apparatus comprising at least one processor and a memory, the hooking detection method comprising:
receiving, by the at least one processor, identification values from a plurality of clients, each of the identification values being generated based on an executable code of a target function as an internal function provided from an executable module or an external function referenced by the executable module in association with the executable module loaded to each of memories of the plurality of clients, and each of the identification values including at least a portion of the executable code of the target function or a hash value into which the at least a portion of the executable code is converted by the hash function;
clustering, by the at least one processor, the received identification values based on identifiers of target functions associate with the received identification values such that the received identification values are clustered into a respective cluster for each target function of the target functions;
comparing, by the at least one processor, the clustered identification values in the respective cluster for said each target function; and determining, by the at least one processor, a hooking state of said each target function, based on the comparison result, by
- determining identical identification values among the clustered identification values included in the respective cluster as normal identification values representing a non-hooking state for respective target function of the target functions, and
- determining non-identical identification values other than the identical identification values among the clustered identification values included in the respective cluster as identification values representing a hooking state for the clustered target function, wherein the executable code has been acquired by
- verifying information on the target function,
- acquiring a start address and an end address of the target function based on the information on the target function, and
- acquiring the executable code of the target function from the start address to the end address of the target function, the executable code including at least one instruction.

13. A computer apparatus comprising:
at least one processor configured to execute computer-readable instructions that cause the processor to,
receive identification values from a plurality of clients, each of the identification values comprising an executable code of a target function as an internal function provided from an executable module or an external function referenced by the executable module in association with the executable module loaded to each of memories of the plurality of clients, and each of the identification values including at least a portion of the executable code of the target function or a hash value into which the at least a portion of the executable code is converted by the hash function,
cluster the received identification values based on identifiers of target functions associated with the received identification values such that the received identification values are clustered into a respective cluster for each target function of the target functions,
compare the clustered identification values in the respective cluster for said each target function, and
determine a hooking state of said each target function, based on the comparison result, by
- determining identical identification values among the clustered identification values included in the respective cluster as normal identification values representing a non-hooking state for a respective target function of the target functions, and
- determining non-identical identification values other than the identical identification values among the clustered identification values included in the respective cluster as identification values representing a hooking state for the clustered target function, wherein the executable code has been acquired by
- verifying information on the target function,
- acquiring a start address and an end address of the target function, and
- acquiring the executable code of the target function from the start address to the end address of the target function, the executable code including at least one instruction.

* * * * *